United States Patent [19]

Price

[11] 3,938,498
[45] Feb. 17, 1976

[54] CONTROL SYSTEM FOR FRYING APPARATUS

[75] Inventor: George M. Price, Shreveport, La.

[73] Assignee: The Frymaster Corporation, Shreveport, La.

[22] Filed: Feb. 18, 1975

[21] Appl. No.: 550,350

Related U.S. Application Data

[62] Division of Ser. No. 479,661, June 17, 1974, Pat. No. 3,870,859.

[52] U.S. Cl. .................. 126/374; 99/326; 99/403; 219/437; 219/441; 219/510
[51] Int. Cl.² ........................................ A47J 27/00
[58] Field of Search ...... 126/374; 99/403, 404, 411, 99/426, 326; 219/394, 404, 435, 437, 441, 442, 454, 510, 511, 480

[56] References Cited
UNITED STATES PATENTS

| | | | |
|---|---|---|---|
| 2,668,898 | 2/1954 | VonBehren | 219/404 |
| 2,805,314 | 9/1957 | Michaelis | 219/437 |
| 3,242,849 | 3/1966 | Wells | 99/411 |
| 3,573,861 | 4/1971 | Lecrone | 99/404 |

Primary Examiner—Carroll B. Dority, Jr.
Assistant Examiner—Larry I. Schwartz
Attorney, Agent, or Firm—Hubbard, Thurman, Turner & Tucker

[57] ABSTRACT

In apparatus for deep fat frying, control circuitry is provided for regulating the temperature of heating elements. During cooking the heating elements are immersed in cooking fluid and are maintained at a selected temperature by an operating thermostat. Two high limit thermostats are provided to turn off the heaters if the temperature exceeds a predetermined safe limit. For cleaning, the heating elements are raised out of the cooking fluid and automatically disconnected from the operating and first high-limit thermostats. The heaters are cyclically actuated and deactuated by a thermal time delay relay, to gradually raising the heater temperature to achieve pyrolytic cleaning of the heating elements. The second high-limit thermostat turns off the heating elements when a predetermined temperature is reached, ending pyrolytic cleaning.

1 Claim, 6 Drawing Figures

CONTROL SYSTEM FOR FRYING APPARATUS

This is a division of application Ser. No. 479,661, now U.S. Pat. No. 3,870,859, filed June 17, 1974.

BACKGROUND AND SUMMARY OF THE INVENTION

This invention relates to a control system for frying apparatus. More particular, this invention concerns a thermstat control system for regulating and limiting the temperature of heating elements during cooking and pyrolytic cleaning cycles.

In deep fat frying system the electric heating elements often become coated with residues from the oil and cooked products after prolonged cooking periods. Cleaning the elements by hand is quite tedious and time consuming. Thus, the practice of burning off the elements, called pyrolytic cleaning, is sometimes employed. In pyrolytic cleaning the heating elements are raised to relatively high temperatures, usually between 600° and 900° F. Above about 1000° F. the burner elements may discolor and oxidize, possibly resulting in permanent damage to the elements. Moreover, pyrolytic cleaning has been found to be safer and more effective if the temperature of the elements is raised gradually to allow slow burn-off to occur and decrease the possibility of damage to the heating elements and associated apparatus.

During cooking, malfunctions of the operating thermostat may cause overheating of the cooking fluid resulting in burning of the product, premature deterioration of the cooking fluid and even flash burning of the fluid. Thus, the cooking fluid temperature must be maintained below a safe temperature limit, usually about 475° F. in order to insure a safe and efficient cooking operation.

The present invention concerns control apparatus for use in fyring systems to regulate and limit the temperature of heating elements during cooking and pyrolytic cleaning. A first control circuit is provided for maintaining the temperature of the elements below a first predetermined cooking limit. A second control circuit maintains the temperature of the heating elements below a second predetermined limit during pyrolytic cleaning of the elements. A function switch selectively connects said first control circuit or said second control circuit to the heater elements depending upon whether cooking or pyrolytic cleaning of the elements is desired.

In another aspect of the invention, a high-limit cooking thermostat is connected to a frypot heater to limit the cooking temperature of the heater. A high-limit burn-off thermostat is connected to the heater for maintaining the temperature of the heater below a higher temperature during pyrolytic cleaning. A switch operates to bypass the high-limit cooking thermostat during pyrolytic cleaning to allow the heater to rise to the higher temperature before being disconnected by the burn-off thermostat.

In accordance with a further aspect of the invention, identical first and second high limit thermostats are attached to heating elements in a frypot. The heating elements operate in cooking fluid during a cooking phase and can be raised out of the fluid and burned off during a pyrolytic cleaning phase. The first and second thermostats are both connected into the heater circuitry during the cooking phase in cooking fluid, and are set to open above a safe operating temperature limit. The second thermostat remains in the heater circuitry during the pyrolytic cleaning phase and is set to open above a higher temperature limit. A percentage relay cycles the heaters off and on to slow the temperature rise of the heater elements during pyrolytic cleaning, thereby protecting the elements from damage and improving the efficiency of the cleaning process. A manual reset switch is provided to prevent automatic recycling of the thermostats after the predetermined temperature limits have been exceeded. A function switch automatically disconnects the first thermostat when the heating elements are raised out of the cooking fluid and automatically reconnects the first thermostat when the heating elements are returned to cooking position in the fluid.

BRIEF DESCRIPTION OF THE DRAWINGS

For a more complete understanding of the present invention and for further objects and advantages thereof, reference may now be had to the following description taken in conjunction with the accompanying drawings in which.

DESCRIPTION OF THE PREFERRED EMBODIMENT

Figures 1, 2:
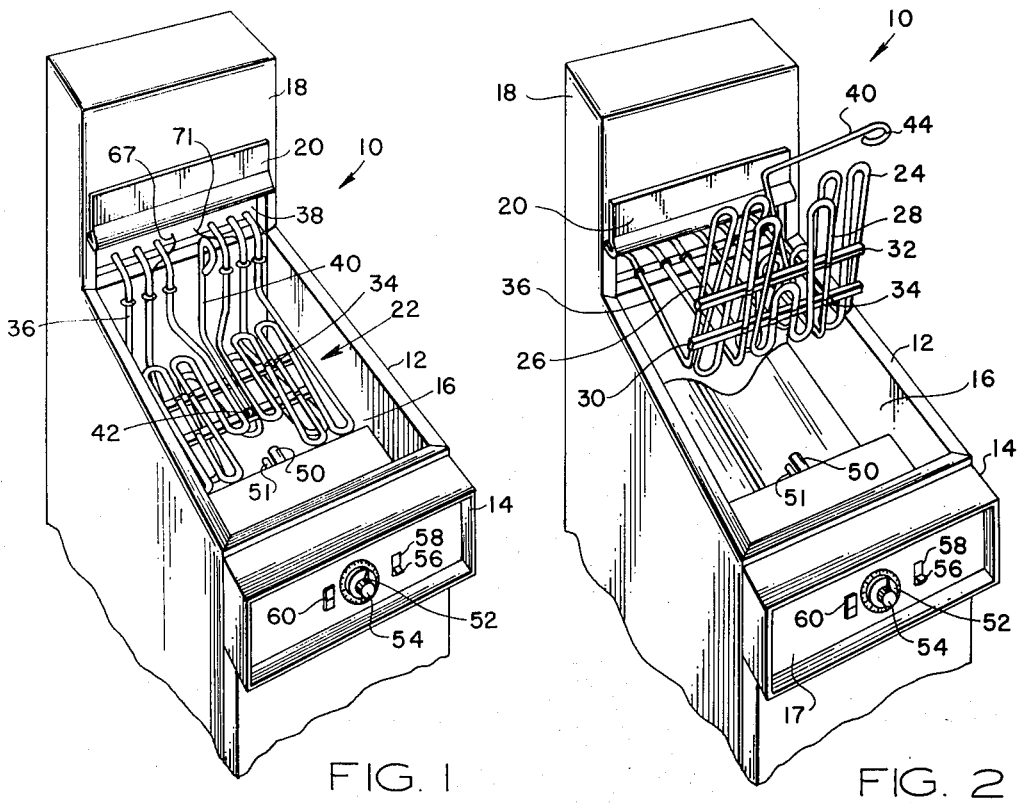
FIG. 1 is a top perspective view of a frying apparatus incorporating a preferred embodiment of the present invention.
FIG. 2 is a top perspective view of the frying apparatus of FIG. 1 with the heater coils in raised position.

Referring now to FIGS. 1 and 2, a frying apparatus 10 includes a rigid housing structure 12 supporting an upper panel 14. A cooking basin 16 is provided in the top of housing structure 12 behind front panel 14 for containing cooking fluid normally used in deep fat frying. A back panel 18 extends vertically above the rear of cooking basin 16. A suspension plate 20 is connected to extend horizontally across back panel 18 just above cooking basin 16. Plate 20 is positioned to suspend wire mesh cooking baskets (not shown) over the cooking fluid of basin 16.

A plurality of heating elements 22 are suspended horizontally near the bottom of cooking basin 16. Elements 22 include two upper coils 24 and 26 and a lower coil 28. Each coil is mounted on two cross bar pieces 30 and 32 by suitable straps 34. A pair of connecting rods 36 are integral with each coil and extend vertically up the back of cooking basin 16 to attach to a pivot piece 38 at the base of back panel 18. A lever arm 40 extends vertically down the back of cooking basin 16 and thence horizontally to pivotally connect to one of cross bar 32 at pivot point 42. A loop 44 is provided at the top of lever arm 40 for pulling the arm 40 to tilt heating elements 22 upward out of basin 16 as shown in FIG. 2.

Figure 3:
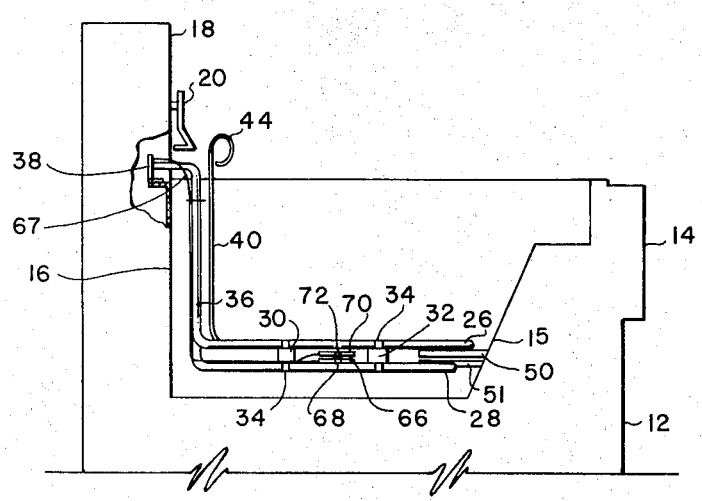
FIG. 3 is a side elevational partial view of the frying apparatus of FIG. 1.

As best seen in FIG. 3, an operating thermostat 50 is mounted on a sloping inner wall 15 of upper panel 14 and extends horizontally into the upper front portion of cooking basin 16. Thermostat 50 may be a differential expansion type having a separate heater 51 mounted below thermostat 50 on wall 15. The structure and function of thermostat 50 and heater 51 are more fully shown and described in my copending U.S. Pat. application Ser. No. 465,918 filed on May 1, 1974.

A temperature selector dial 52 is mounted on the front of upper panel 14 for selecting the desired temperature for the operating thermostat 50. A heater light 54 is provided at the center of selector dial 52 to indicate the on-off status of the heating elements. A main on-off switch 56 is mounted on the right side of selector dial 52 and is provided with a main indicator light 58 therein. A high limit light 60 is mounted on the left side of selector dial 52 to indicate shut down of the heater elements because of excessive temperatures.

Figure 4:
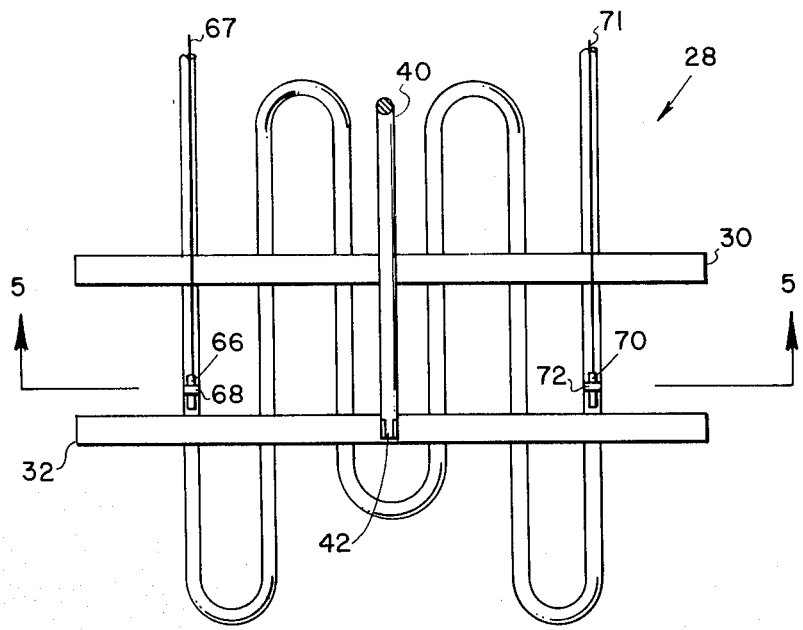
FIG. 4 is an enlarged fragmentary plan view of the lower coil of the frying apparatus of FIG. 1.
Figure 5:
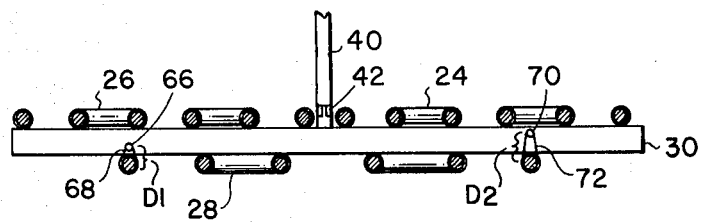
FIG. 5 is a sectional front view of the lower coil of FIG. 3 taken along line 5—5.

FIGS. 3, 4 and 5 disclose the heating elements 22 and associated thermostats in more detail. A first high limit thermostat 66 is connected above one side of lower coil 28 by a metal strap 68. A second high-limit thermostat 70 is further mounted above the other side of coil 28 by a metal strap 72. Thermostats 66 and 70 are preferably pressure bulb thermostats being filled with a temperature sensitive liquid, such as mercury, and having capillary tubes 67 and 71 running along lower coil 28 and connecting rods 36 to back panel 18. Both thermostats have a "fail-safe" construction so that if the bulb or capillary leaks the thermostat switch will open. A manual reset switch (not shown) is provided in connection with thermostat 70 to prevent inadvertent automatic start-up after thermostat 70 has opened the circuit. The reset switch includes a hold-in relay which must be reset by hand before the circuit will be reactivated. First high-limit thermostat 66 is spaced further closer to lower coil 28 than second high-limit thermostat 70. Thermostat 66 is in series with operating thermostat 50 and functions during the cooking process to turn off heater elements 22 if the temperature of the cooking fluid exceeds a critical temperature, normally about 475° F, to prevent danger to the operator and damage to the equipment. Second high-limit thermostat 70 is positioned further away from coil 28. Thermostat 70 operates as a back-up to thermostat 66 to cut off the heaters if the safe operating temperature is exceeded. Furthermore, second high-limit thermostat 70 is used during pyrolytic cleaning of the coils of heating elements 22 to turn off the elements after heating to a higher temperature. When the heating elements 22 are tilted upward out of the cooking fluid as shown in FIG. 2, first high-limit thermostat 66 is disconnected from the circuit and second high-limit thermostat 70 allows the coils of elements 22 to reach a much higher temperature, about 900° to 1,000° F, before being shut off.

As shown in FIG. 5, the distance D1 between first high-limit thermostat 66 and lower coil 28 is somewhat less than the distance D2 between second high-limit thermostat 70 and lower coil 28. The distance D1 is critical for proper shut-down of the cooking circuitry at very low oil levels, especially when the oil level drops below the coils, as required in safety testing. Distance D1 must be accurately determined or fire may result. Distance D2 is also critical during pyrolytic cleaning. If D2 is too great, excessive element temperatures may damage the coils during burn-off. On the other hand, if second high-limit thermostat 70 is placed too close to the coils 28, premature shut-down of the heating elements 22 may occur. Distances D1 and D2 are not as critical during cooking because the cooking fluid conducts the heat more readily. Although first high-limit thermostat 66 is closer to the coils, it has been found that second high-limit thermostat 70 will shut off the coils at about the same time. Both thermostats 66 and 70 are located above the heating elements in order to obtain accurate readings because of convection currents of the cooking fluid and the atmosphere.

Figure 6:
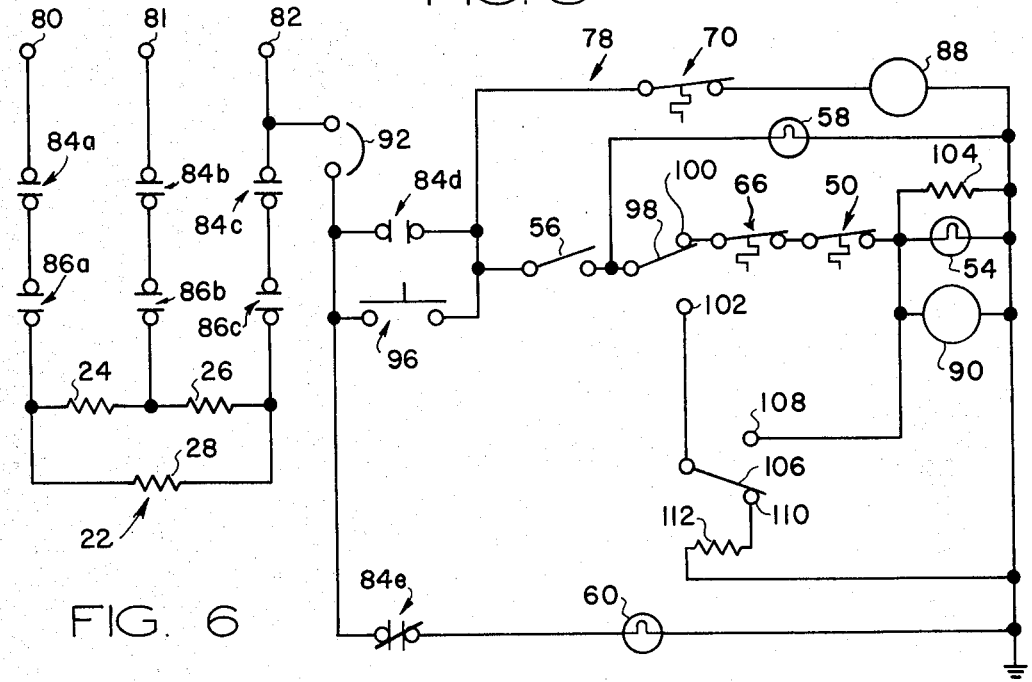
FIG. 6 is a schematic diagram of the control circuitry for the frying apparatus of FIG. 1.

FIG. 6 discloses the electrical circuitry 78 employed for automatically regulating and limiting the cooking and cleaning processes using apparatus 10. Electrical inputs 80, 81 and 82 are connected to a contactor 84 having contacts 84a, 84b, 84c, 84d and a reverse contact 84e. Contactor 84 in turn is connectected through a contactor 86 having contacts 86a, 86b and 86c, to heating elements 22 comprising upper coils 24 and 26 and lower coil 28. A contactor coil 88 is positioned to activate contactor 84, and a contactor coil 90 activates contactor 86. A circuit breaker 92 is connected between input line 82 and circuitry 78 to prevent damage from overloading. The other side of circuit breaker 92 is connected in parallel to a contact 84d of contactor 84 and a reset switch 96. An on-off switch 56 is provided at the output of contact 84d and switch 96. Main indicator light 58 is connected between the on-off switch 56 and neutral. The second high-limit thermostat 70 is also connected between reset switch 96 and neutral through contactor coil 88.

The other side of on-off switch 56 is connected to a two-way function switch 98 having an upward position with post 100 for a cooking function and a downward position in contact with post 102 for a cleaning function. Connected to post 100 in series are first high-limit thermostat 66 and operating thermostat 50. On the other side of thermostat 50, connected in parallel, are a biasing heater 104 for use in conjunction with operating thermostat 50, heater light 54, and contactor coil 90. Connected to post 102 of function switch 98 is a twoway percentage relay switch 106 having an upward burn-off position when in contact with a post 108 and a downward delay position when in contact with post 110. Connected to post 110 is a heater resistor 112 which operates in association with delay relay switch 106. Heater resistor 112 is in turn connected to neutral. Reverse contact 84e of contactor 84 is connected between circuit breaker 92 and neutral through high-limit light 60 and closes whenever thermostats 66 and 70 open contact 84 because of a high temperature condition.

In operation, power, usually 120 volts, is impressed on control circuit 78 through inputs 80, 81 and 82. Circuit breaker 92 is normally closed. When reset switch 96 is depressed, contactor coil 88 is activated to close contacts 84a, 84b, 84c, 84d of contactor 84 and to open reverse contact 84e. A circuit is maintained through second high-limit thermostat 70 by contact 84d which will continue to hold until interrupted by a power loss or a high temperature condition opening thermostat 70. The frying apparatus 10 is placed in operation by closing on-off switch 56. When heating elements 22 are positioned in cooking basin 16, switch 98 is in the upward cooking position in contact with post 100. Activating switch 56 therefore energizes contactor coil 90 closing contactor 86 and supplying power to heating elements 22. Thermostats 66 and 50 are also actuated as well as biasing heater 104. The selected cooking temperature on selector dial 52 is maintained by operating thermostat 50 which turns heating elements 22 off and on.

Should operating thermostat 50 fail for any reason, first high-limit thermostat 66 will cut off contactor coil 90 and contactor 86 shutting down heating elements 22 as soon as a preselected temperature has been reached. As previously mentioned, the critical temperature is normally considered to be around 475° F. above which danger or damage may occur. If contactor coil 90 welds or sticks shut, second high-limit thermostat 70 will open, dropping out contactor coil 88 and contactor 84 to turn off heater elements 22 and prevent fire or damage.

When it is desired to clean the coils, the end loop 44 of lever arm 40 is grasped and pulled upward to tilt heating elements 22 out of the cooking fluid to a vertical position as shown in FIG. 2. This action automatically throws function switch 98 downward to contact post 102 in the cleaning position. Percentage relay switch 106 is normally downward against post 110 in the delay position. A closed circuit is thus formed by-passing operating thermostat 50 and first high-limit thermostat 66. The temperature of heating elements 22 is allowed to rise to a pyrolytic burn-off level of about 600° to 900° F. During this rise in temperature, percentage relay switch 106 cycles between its burn-off position in contact with post 108 and its delay position in contact with post 110. After remaining in the delay position for about 20 seconds, heater resistor 112 reaches a temperature sufficient to throw the contacts of switch 106 to post 108 thereby energizing contactor coil 90 and heating elements 22. After cooling off, delay relay switch 106 again drops to make contact with lower post 110 in the delay position, turning off heating elements 22 and reactivating heater resistor 112. This cycling action provides for an approximate on time of 40% for the heater elements 22 and biasing heater 104 thereby slowing the rate of temperature rise of the heater elements 22.

In this manner, the pyrolytic burn-off of accumulated dirt, food and other debris on heater elements 22 is accomplished gradually and no risk is taken that damaging temperatures may be inadvertently reached. After several minutes of pyrolytic burn-off, the heater elements 22 will reach a temperature sufficient to open second high-limit thermostat 70 and deactivate contactor coil 88. Contactor 84 is thereby opened, turning off heating elements 22. As previously mentioned, thermostat 70 is provided with a reset switch which cannot automatically restart the circuit but must be manually reset. Normally sufficient burn-off has occurred by the time thermostat 70 opens the circuit that the cooking process may be resumed. Heating elements 22 are allowed to cool and then are returned to the cooking fluid by pushing lever arm 40 down. Reset switch 96 is then depressed to again begin the normal cooking operation.

It is understood from the foregoing description that the control system of the present invention provides several important advantages over other systems. By providing for pyrolytic cleaning of the heating coils, considerable delay, time and effort are eliminated. The coils need not be cooled down in order to clean the coils. The high-limit thermostats connected directly to the heating coils provide a simple means for protecting the coils during the cooking and cleaning processes. As previously indicated, the same type thermostats may be used for both applications by simply placing them different distances from the heating coils and setting them to cut off at different temperatures. By using these two thermostats, the possibility of damage to the coils or other equipment is avoided.

Moreover, the automatic operation of the thermostats eliminates any need for the operator to reach across the cooking fluid during cooking or near the heating coils during the pyrolytic cleaning to adjust or turn off controls thereby risking injury. The use of the thermal percentage delay relay insures that the temperature of the heating elements will not rise too rapidly during the pyrolytic cleaning phase but will gradually burn off the accumulated debris from the coils before being turned off by the second high limit thermostat. The manual reset circuit for the high-limit thermostats provides a fail-safe feature to prevent automatic restart when not desired. Moreover, the automatic operation of the function switch in response to movement of heating coils out of or into the cooking basin eliminates the need for further operator action.

Although a particular embodiment of the invention has been illustrated in the accompanying drawings and described in the foregoing detailed description, it will be understood that the invention is not limited to the embodiment disclosed but is capable of rearrangement, modification and substitution without departing from the spirit of the invention.

What is claimed is:
1. In a food frying system the combination comprising:
   a plurality of heater elements adapted for connection to a power source for heating cooking fluid in said system, said elements being pivotally attached to said system to rotate from a first position in said cooking fluid to a second position out of said fluid,
   a first thermostat selectively electrically connected to said heating elements for maintaining said heating elements at a selected cooking temperature,
   a second thermostat attached to and in selective electrical connection with said heating elements for turning off said elements when said elements reach a first predetermined temperature while in said first position,
   a third thermostat attached to and in electrical connection with said heating elements for turning off said elements when said elements reach a second predetermined temperature while in said second position,
   a thermal delay relay selectively connected to said heating elements for cycling said heating elements off and on while said elements are in said second position; and
   a switch in said system for alternately connecting said first and second thermostats to said heating elements and disconnecting said thermal delay relay from said heating elements when said elements are in said first position and for connecting said thermal delay relay to said heating elements and disconnecting said first and second thermostats from said heating elements when said elements are in said second position.

* * * * *